United States Patent [19]

Fuyama et al.

[11] Patent Number: 4,617,575

[45] Date of Patent: Oct. 14, 1986

[54] THERMAL HEAD

[75] Inventors: Moriaki Fuyama; Katsumi Tamura, both of Hitachi; Isao Funyu, Takahagi; Isao Nunokawa, Hitachi; Masanobu Hanazono, Mito; Shigetoshi Hirastuka, Yokohama, all of Japan

[73] Assignee: Hitachi, Ltd., Tokyo, Japan

[21] Appl. No.: 760,623

[22] Filed: Jul. 30, 1985

[30] Foreign Application Priority Data

Jul. 30, 1984 [JP] Japan .............................. 59-160003

[51] Int. Cl.[4] .............................................. G01D 15/10

[52] U.S. Cl. ............................... 346/76 PH; 219/543; 338/309

[58] Field of Search ......................... 219/543, 216 PH; 338/307-309, 312, 314, 327, 328; 346/76 PH, 139 C, 155; 400/120; 430/311; 29/620, 610 R, 621; 174/68.5; 156/374.7; 428/901; 427/124; 361/397

[56] References Cited

U.S. PATENT DOCUMENTS 3,996,551 12/1976 Croson ............................... 338/309

4,250,375 2/1981 Tsutsumi et al. ............. 346/76 PH 4,259,564 3/1981 Ohkubo et al. ..................... 219/543

*Primary Examiner*—A. Evans

*Attorney, Agent, or Firm*—Antonelli, Terry & Wands

[57] ABSTRACT

A thermal head which comprises an electrically insulating substrate, a glaze layer laid thereon, a heating resistor layer laid on the glaze layer, a plurality of first layer conductors laid on the heating resistor layer and provided at predetermined distances, a protective film laid on the heating resistor layer, and a plurality of second layer conductors counterposed to the first layer conductors and laid on the first layer conductors through an interlayer insulating film, where the interlayer insulating layer is in a two layer structure of an inorganic insulating material layer having a compressive stress and an organic insulating material layer, and the organic insulating material layer is positioned on the second layer conductor side. The thermal head as structured above is free from a problem of crack formation on the interlayer insulating layer, causing a short circuit and free from a problem of discontinuation of the second layer conductors.

22 Claims, 4 Drawing Figures

THE INVENTION

THE INVENTION

THE INVENTION

THERMAL HEAD

BACKGROUND OF THE INVENTION

1. Field of the Invention

This invention relates to a thermal head, and more particularly to a thermal head suitable for the facsimile.

2. Description of the Prior Art

A thermal head for the facsimile is usually constituted of an electrically insulating ceramic substrate, a glaze layer laid on the substrate, a tantalum-based or nichrome-based heating resistor formed on the glaze layer, and a plurality of first layer conductors provided at predetermined distances and in a predetermined shape on the heating resistor. The first layer conductor consists of two layers, for example, a chromium layer and an aluminum layer, formed by sputtering or electron beam vapor deposition. Usually, the chromium layer is formed on the glaze layer side.

A protective film is further formed on the exposed parts of the heating resistor, i.e. the parts having no first layer conductors on the surface of the heating resistor. The protective film is provided to improve the oxidation prevention and the wear resistance of the heating resistor, and usually is a film of two layers, i.e. a silicon dioxide ($SiO_2$)5 layer and a tantalum oxide ($Ta_2O_5$)6 layer. The silicon dioxide layer is often formed on the heating resistor side. The protective film is usually formed by sputtering or plasma CVD (chemical vapor deposition).

An interlayer insulating film made of polyimide resin is further formed on the first layer conductor, and throughholes are provided by photoetching the interlayer insulating layer. The interlayer is formed by coating the first layer conductor with polyimide resin and heating the coated first layer conductor at a temperature of about 350° C., thereby baking the resin.

A second layer conductor consisting, for example, of laminates of a chromium layer, a copper layer and a gold layer is further formed on the interlayer insulating film and the throughholes by sputtering or electron beam vapor deposition. The thermal head is thus structured as above.

The thermal head as structured above has such a disadvantage that whiskers grow on the chromium layer and the aluminum layer of the first layer conductor, particularly on the aluminum layer due to the growth of aluminum crystal grains, depending on the heating history of the step for forming the interlayer insulating film made of the polyimide resin, and the growing whiskers break the interlayer insulating film to make a short circuit with the second layer conductor, i.e. to deteriorate the function of the thermal head.

A thermal head using inorganic silicon nitride ($Si_3N_4$) as the interlayer insulating film in place of the organic polyimide is disclosed in Japanese Patent Application Kokai (Laid-open) No. 58-203068. However, it has been found that when silicon nitride is used as a material for the interlayer insulating film, cracks are formed on the interlayer insulating film during the formation of through-holes, and also that the interlayer insulating film is susceptible to a thermal shock during the printing, and once cracks are formed on the interlayer insulating film, the interlayer insulating film peels off at the locations of the cracks as the starting points owing to the shocks by the transfer of printing paper. It has been further found that, when silicon nitride is used as a material for the interlayer insulating film, the inside wall surfaces of throughholes as formed are vertically extended and when the second layer conductor is formed on the throughholes, the second layer conductor is discontinued at the vertically extended inside surfaces to deteriorate the connections.

SUMMARY OF THE INVENTION

OBJECTS OF THE INVENTION

An object of the present invention is to provide a thermal head free from the cracking problem when silicon nitride is used as a material for the interlayer insulating film.

Another object of the prsent invention is to provide a thermal head free from the deteriorated connection problem of the second layer conductor when silicon nitride is used as a material for the interlayer insulating film.

STATEMENT OF THE INVENTION

According to the present invention, an interlayer insulating film for the thermal head is made of an inorganic insulator having a compressive stress. This has been found as a result of studying causes for formation of cracks on silicon nitride. That is, cracks are formed on an interlayer insulating film made of silicon nitride $Si_3N_4$, because the film stress on silicon nitride $Si_3N_4$ is a tensile stress which is relieved when the throughholes are formed. For example, a $Si_3N_4$ film having a thickness of 4.0 $\mu m$ has a film stress of 350 g/mm$^2$. It has been formed that the crack formation can be prevented by using in inorganic insulating material having a compressive stress as a material for the interlayer insulating film.

The inorganic insulating material having a compressive stress includes silicon dioxide $SiO_2$ and tantalum pentoxide $Ta_2O_5$. A $SiO_2$ film having a thickness of 4.0 $\mu m$ has a film stress of 120 g/mm$^2$ and a $Ta_2O_5$ film having the same thickness has a film stress of 30 g/mm$^2$, and it is preferable to use $SiO_2$ among the inorganic insulating materials.

When polyimide resin is used as a material for the interlayer insulating film, there is such a disadvantage that whiskers grow on the aluminum layer of the first layer conductor due to the growth of aluminum crystal grains, depending on the heating history of the step for preparing the interlayer insulating film to make a short circuit with the second layer conductor, and it has been found that such a disadvantage can be eliminated by making the interlayer insulating film from the inorganic insulator.

When silicon nitride is used as a material for the interlayer insulating film, the inside wall surfaces of throughholes are vertically extended, and the second layer conductor is not formed on the vertically extended inside wall surfaces as a disadvantage, as already mentioned before. This also appears when silicon dioxide or tantalum pentoxide is used as a material for the interlayer insulating film. The inside wall surfaces of throughholes are vertically extended on the following grounds.

When polyimide resin is used as a material for the interlayer insulating film, throughholes can be formed by wet etching, whereas when an inorganic insulating material is used, the wet etching is no more applicable, but dry etching with a gas mixture of $CF_4$ and $O_2$ as reacting gases must be employed. The side etch parts (recess parts) of contact throughholes as dry etched are vertically extended, and thus the second layer conductor to be formed thereon is discontinued at the recess parts, thereby deteriorating the connections. The problem that the side etch parts of throughholes on the inorganic insulating material such as $SiO_2$, etc. for the interlayer insulating film are vertically extended and the second layer conductor is discontinued at these parts can be solved by applying an organic insulating film of, for example, polyimide resin, having a levelling effect thereto after the etching of the inorganic insulating material, and etching the polyimide resin coating with a smaller throughhole diameter than that for the inorganic insulating material, thereby making the recess parts of the throughholes into a tapered form, and thereby preventing the discontinuation of the second layer conductor to be formed thereon.

When the interlayer insulating film is made only of an inorganic insulating material, many pinholes are formed, and there is a trouble of short circuits through the pinholes. By making the interlayer insulating film from two layers, i.e. an inorganic insulating material layer and a polyimide resin layer, the troubles of short circuits through pinholes can be eliminated.

The inorganic insulating material as a material for the interlayer insulating film can be also used as a material for the protective film. When silicon dioxide is used as the inorganic insulating material and the material for the protective film at the same time, the protective film must be in a multi-layer structure, in which it is preferable that silicon dioxide is employed at a lower layer and silicon nitride $Si_3N_4$ or tantalum pentoxide $Ta_2O_5$ is laid thereon as a laminate. Silicon dioxide has a compressive strain and hardly peels off, but is a little poor in the wear resistance. Thus, it is effective to cover the upper surface of silicon dioxide with silicon nitride or tantalum pentoxide having a good wear resistance. When silicon nitride is used as a material for the interlayer insulating film and as a material for the protective film at the same time, it is desirable to provide a silicon dioxide layer between the heating resistor and the protective film made of silicon nitride. Silicon nitride $Si_3N_4$ has a higher thermal conductivity, i.e. 0.04 cal/cm·sec·°C. than that of silicon dioxide $SiO_2$, i.e. 0.0033 cal/cm·sec·°C., and thus an increase in the recording efficiency can be expected by forming silicon nitride as a protective film on the silicon dioxide layer. Furthermore, silicon nitride $Si_3N_4$ has a higher strength, i.e. 2,000 to 3,000 kg/mm$^2$, than that of tantalum pentoxide $Ta_2O_5$, i.e. 500 to 1,000 kg/mm$^2$, and thus an increase in the head durability can be expected.

According to a most preferable mode of the present thermal head, a protective film consisting of two layers is employed, one layer of which is a $SiO_2$ layer and is used as an interlayer insulating layer at the same time, and an organic insulating layer of, e.g. polyimide resin is laid on the first interlayer insulating layer, thereby utilizing the interlayer insulating film of the two layers.

With the thermal head as structured above, the printing efficiency and printing reliability can be increased together with better quality. With this structure, it is possible to prevent a short circuit due to the growth of whiskers on the first layer conductor to prevent deteriorated connection between the first layer conductor and the second layer conductor, and to make the reliability higher and the production cost lower.

PREFERRED EMBODIMENTS OF THE INVENTION

The present invention will be described in detail, referring to embodiments.

Figure 1:
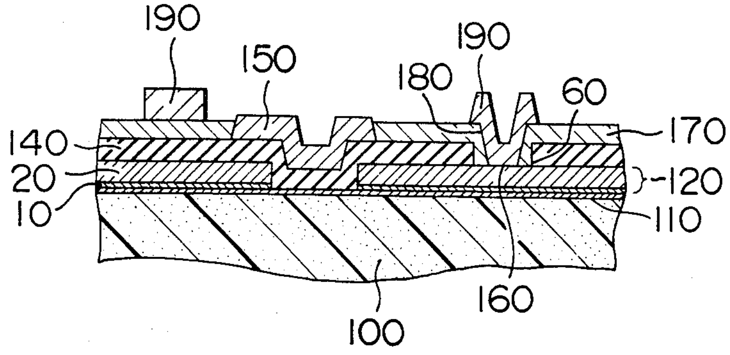
FIG. 1 is a cross-sectional view of a thermal head according to a first embodiment of the present invention.

In FIG. 1 one embodiment of the present invention is shown, where a heating resistor 110 of chromium-silicon (Cr—Si) alloy having a thickness of 0.1 μm and a first layer conductor 120 consisting of a chronium layer 10 and an aluminum layer 20 are formed in a predetermined pattern on an alumina substrate 100 with a glaze layer as an insulating substrate. Then, a protective film 140 made of silicon dioxide $SiO_2$ and serving as an insulating film at the same time is formed thereon throughout the entire surface by sputtering or plasma CVD so far used, preferably, to a thickness of about 3 μm. Then, a silicon nitride $Si_3N_4$ film 150 is formed only on the heating resistor 110 by mask plasma CVD. Crack formation can be prevented by the release of the stress on the silicon nitride $Si_3N_4$ because the silicon nitride film 150 is formed by mask plasma CVD. In this embodiment, the silicon nitride film is not used as the interlayer insulating film, and thus the silicon nitride $Si_3N_4$ film having a thickness of 1.5 to 2.0 μm is enough with respect to the wear resistance. Thus, an advantage such as a lower stress can be obtained. Since the silicon dioxide $SiO_2$ film 140 is formed as the protective film serving as the interlayer insulating film at the same time on the first layer conductor 120, the growth of aluminum whiskers depending on the heating history of the succeeding step can be prevented to eliminate deterioration by short circuit.

Then, a contact throughhole 160 is formed on the silicon dioxide $SiO_2$ film 140 serving as the protective film and the interlayer insulating film at the same time.

For etching the silicon dioxide ($SiO_2$) film 140 to form the contact throughhole 160, a wet etching using a HF—$NF_4F$-based etching solution is effective. After the etching, the edge part of the throughhole 160 on the $SiO_2$ film has a vertically extended surface 60, and thus is covered with a polyimide resin film 170. Then, the polyimide resin film 170 is etched with a throughhole diameter, which is smaller than that of the contact throughhole 160 on the $SiO_2$ film and in such a range as not to increase the contact resistance, on the same position as that for the contact throughhole 160 on the $SiO_2$ film. For etching the polyimide resin film 170, a wet etching using a hydrazine-ethylenediamine-based etching solution is effective. After the contact throughhole 180 is formed on the polyimide resin film 170 by the wet etching, a second layer conductor 190 is formed. A multi-layer circuit processing for the thermal head according to this embodiment is completed with the foregoing steps.

Figure 2:
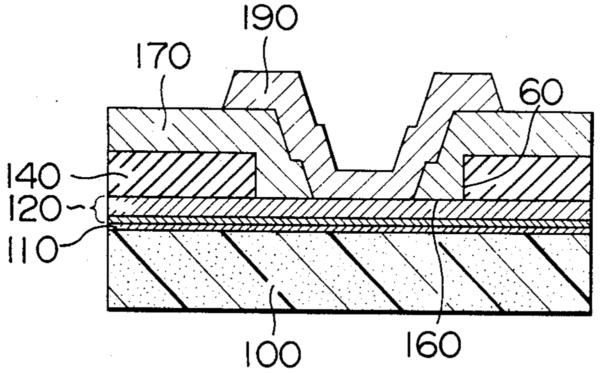
FIG. 2 is an enlarged cross-sectional view of a throughhole tapered part according to the first embodiment of the present invention.

In FIG. 2, a cross-sectional shape of the contact throughhole part of the thermal head prepared by the processing according to the embodiment shown in FIG. 1 is given. As is obvious from FIG. 2, the vertically extended surface 60 of the throughhole edge part on the $SiO_2$ film is covered with the polyimide resin film 170 and the edge part of the throughhole 180 on the polyimide resin film 170 is etched in a tapered shape to prevent discontinuation of the second layer conductor 190 when formed.

Figure 3:
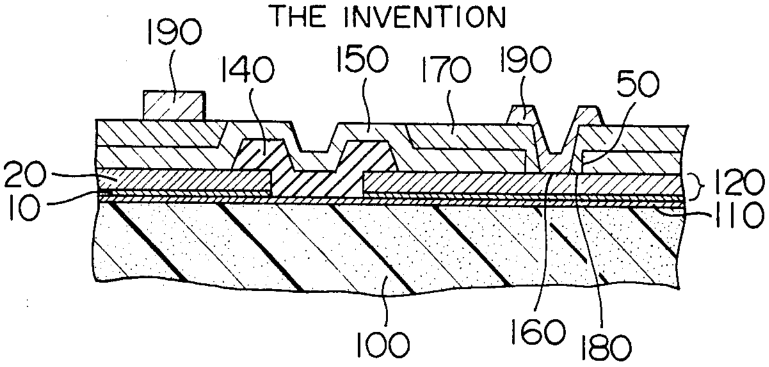
FIG. 3 is a cross-sectional view of a thermal head according to a second embodiment of the present invention.

In FIG. 3, a thermal head for the facsimile according to another embodiment of the present invention is shown, and the thermal head has a protective film serving also as an interlayer insulating film, and has the same effects as in the case of the embodiment of FIG. 1.

The features and the effect of this embodiment will be described, referring to FIG. 3.

At first, a heating resistor 110 of Cr—Si alloy having a thickness of 0.1 μm and a first layer conductor 120 consisting of a Cr layer 10 and an A1 layer 20 are formed in a predetermined pattern on an alumina substrate 100 with a glaze layer. Then, a $SiO_2$ film 140 is formed as a protective film only on the heating resistor 110 by sputtering or mask plasma CVD to a thickness of about 3 μm, more specifically 2 to 4 μm. Then, a $Si_3N_4$ film 150 serving as a protective film and an interlayer insulating film at the same time is formed thereon throughout the entire surface by sputtering or plasma CVD. As described as to the embodiment of FIG. 1, the plasma CVD procedure having a higher formation rate is preferable. By employing an inorganic $Si_3N_4$ interlayer insulating film, growth of aluminum whiskers on the first layer conductor 120 can be prevented. The $Si_3N_4$ film having a thickness of 1.5 to 2.0 μm is enough. Then, the $Si_3N_4$ film is etched to form a contact throughhole 160. Wet etching of the $Si_3N_4$ film is difficult to conduct, and thus dry etching using a gas mixture of $O_2$, $H_2$, etc. with a fluorinated gas such as $CF_4$, $CHF_3$ or $C_2F_6$ is preferable. The dry etching rate of the $Si_3N_4$ film is 0.1 to 0.2 μm/min. Since the thickness of the $Si_3N_4$ film is as thin as 1.5 to 2.0 μm, the stress thereon is small, and thus crack formation does not occur or occurs very slightly after the etching.

Figure 4:
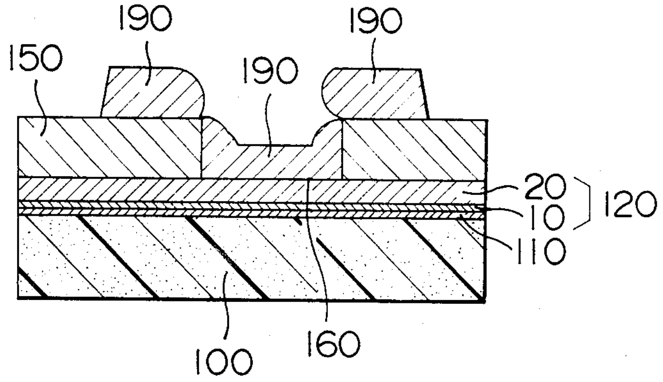
FIG. 4 PRIOR ART
FIG. 4 is an enlarged cross-sectional view of a throughhole tapered part according to the prior art.

When the throughhole is formed by dry etching, the edge part of the throughhole generally has a vertically extended surface 50, and thus the second layer conductor 190 formed thereon discontinues at the edge part of the throughhole as shown in FIG. 4, where the same reference numerals as in FIGS. 1–3 have the same meanings. Thus, a polyimide resin film 170 is formed on the $Si_3N_4$ film and a contact throughhole 180 is formed with a smaller throughhole diameter than that of the throughhole 160 on the $Si_3N_4$. The same etching solution as used in the embodiment of Fig. 1 can be also employed for etching the polyimide resin film 170. The edge part of the contact throughhole 180 has the same shape as shown in FIG. 2. Then, a second layer conductor 190 is formed thereon. The thermal head of this embodiment is completed with the foregoing steps.

The present thermal head has a protective film of two layers, i.e. $SiO_2/Si_3N_4$, and an interlayer insulating film of two layers, i.e. $Si_3N_4$/polyimide resin (PIQ: polyimidoisoindroquinazolidione), where $Si_3N_4$ is used in both protective film and interlayer insulating film. The thermal head of FIG. 3 as structured above has the same effects as the thermal head shown in FIG. 1.

As described above, the printing efficiency and the printing reliability can be increased together with better quality in the present invention.

What is claimed is:

1. A thermal head, which comprises an electrically insulating substrate, a glaze layer laid thereon, a heating resistor layer laid on the glaze layer, a plurality of first layer conductors laid on the heating resistor layer and provided at predetermined distances, a protective film laid on the heating resistor layer, and a plurality of second layer conductors counterposed to the first layer conductors and laid on the first layer conductors through an interlayer insulating film, the interlayer insulating layer being in a two-layer structure of an inorganic insulating material layer and an organic insulating material layer, the organic insulating material layer being positioned on the second layer conductor side.

2. A thermal head, which comprises an electrically insulating substrate, a glaze layer laid thereon, a heating resistor layer laid on the glaze layer, a plurality of first layer conductors laid on the heating resistor layer and provided at predetermined distances, a protective film laid on the heating resistor layer, and a plurality of second layer conductors counterposed to the first layer conductors and laid on the first layer conductors through an interlayer insulating layer, the interlayer insulating layer being a two-layer structure of an inorganic insulating material layer and an organic insulating material layer, the organic insulating material layer being positioned on the second layer conductor side, and the interlayer insulating layer having throughholes extending therethrough, with such throughholes being formed by forming holes through the inorganic insulating material layer by dry etching, prior to forming the organic insulating material layer; then forming a layer of the organic insulating material on the inorganic insulating material layer, including in the holes; and then etching the layer of organic insulating material in the holes by wet etching so as to form the throughholes into a tapered form.

3. A thermal head according to claim 1, wherein the inorganic insulating material layer is a film formed by sputtering.

4. A thermal head according to claim 2, wherein the inorganic insulating material layer is a film formed by plasma CVD.

5. A thermal head according to claim 1, wherein said interlayer insulating layer of two-layer structure has through-holes extending therethrough, with the second layer conductors extending in the throughholes.

6. A thermal head according to claim 5, wherein the protective film has a multi-layer structure, whose lower layer adjacent the heating resistor layer is made of silicon dioxide.

7. A thermal head according to claim 6, wherein the material for the protective layer on the silicon dioxide layer is silicon nitride $Si_3N_4$ or tantalum pentoxide $Ta_2O_5$.

8. A thermal head according to claim 6, wherein the layer of the protective film made of silicon dioxide, and the interlayer insulating film, are formed by sputtering or plasma CVD.

9. A thermal head according to claim 6, wherein the protective layer on the silicon dioxide layer is a layer formed by mask plasma CVD.

10. A thermal head according to claim 1, wherein the organic insulating material is polyimide resin.

11. A thermal head according to claim 1, wherein the inorganic insulating material for the interlayer insulating film is silicon dioxide.

12. A thermal head according to claim 11, wherein the protective film is in a multi-layer structure, whose lower layer in contact with the heating resistor layer is made of silicon dioxide, and whose upper layer is made of an inorganic insulating material having a better wear resistance than that of the silicon dioxide layer.

13. A thermal head according to claim 1, wherein the inorganic insulating material for the interlayer insulating film is silicon nitride.

14. A thermal head according to claim 13, wherein the protective film is in a two-layer structure, whose lower layer is made of silicon dioxide and whose upper layer is made of silicon nitride.

15. A thermal head according to claim 7, wherein the material for the protective layer on the silicon dioxide layer is tantalum pentoxide.

16. A thermal head according to claim 15, wherein the protective film is a double-layer structure, the lower layer thereof being of silicon dioxide and the upper layer being of tantalum pentoxide.

17. A thermal head according to claim 5, wherein said throughholes are formed so as to have the organic insulating material layer of the interlayer insulating layer forming the surface of said throughholes.

18. A thermal head according to claim 17, wherein the organic insulating material forming the surface of the throughholes has a tapered shape, whereby the surfaces of the throughholes do not extend vertically through the interlayer insulating layer.

19. A thermal head according to claim 1, wherein the inorganic insulating material layer of the interlayer insulating layer is made of the same material as a material of the protective film.

20. A thermal head according to claim 10, wherein the polyimide resin is polyimidoisoindroquinazolidione.

21. A thermal head according to claim 2, wherein the organic insulating material layer is made of a polyimide resin.

22. A thermal head according to claim 2, wherein the layer of organic insulating material is etched so as to have a smaller diameter of the throughholes than the diameter of the holes formed through the inorganic insulating material layer.

* * * * *